(12) United States Patent
Wicks

(10) Patent No.: US 7,334,185 B2
(45) Date of Patent: Feb. 19, 2008

(54) DATA MANAGEMENT TOOL

(75) Inventor: Anthony Robert Wicks, London (GB)

(73) Assignee: Everclear Systems Limited, Bletchley, Milton Keynes, Buckinghamshire (GB)

( * ) Notice: Subject to any disclaimer, the term of this patent is extended or adjusted under 35 U.S.C. 154(b) by 347 days.

(21) Appl. No.: 10/656,614

(22) Filed: Sep. 5, 2003

(65) Prior Publication Data

US 2004/0049732 A1 Mar. 11, 2004

(30) Foreign Application Priority Data

Sep. 7, 2002 (GB) ................................. 0220861.9

(51) Int. Cl.
*G06N 3/00* (2006.01)
(52) U.S. Cl. ..................... 715/509; 715/503
(58) Field of Classification Search ................ 715/503, 715/504, 509, 510, 528, 529, 968, 764, 765, 715/905; 707/1, 107
See application file for complete search history.

(56) References Cited

U.S. PATENT DOCUMENTS

| | | | |
|---|---|---|---|
| 5,231,577 A | | 7/1993 | Koss |
| 5,598,519 A | | 1/1997 | Narayanan |
| 6,216,134 B1 | | 4/2001 | Heckerman et al. |
| 6,279,016 B1 | * | 8/2001 | De Vorchik et al. ......... 715/526 |
| 6,587,108 B1 | * | 7/2003 | Guerlain et al. ............ 345/440 |
| 6,694,326 B2 | * | 2/2004 | Mayhew et al. ............ 707/102 |
| 6,745,140 B2 | * | 6/2004 | Sutton ........................... 702/67 |
| 2002/0120604 A1 | * | 8/2002 | Labarge et al. ................. 707/1 |
| 2003/0229848 A1 | * | 12/2003 | Arend et al. ................ 715/509 |
| 2004/0015470 A1 | * | 1/2004 | Smith et al. .................... 707/1 |
| 2004/0032432 A1 | * | 2/2004 | Baynger ...................... 345/810 |
| 2004/0034699 A1 | * | 2/2004 | Gotz et al. ................... 709/223 |
| 2005/0108748 A1 | * | 5/2005 | Nishikawa et al. ........... 725/38 |

FOREIGN PATENT DOCUMENTS

NL 1015712 C 7/2000

OTHER PUBLICATIONS

Sample of a colored table in Excel by examiner, 1985-1999, Microsoft.*
Special Edition using Microsoft 97, Ron Person, Dec. 17, 1996, p. 1-12.*
Davis, Application Development Methodology, Dec. 1996, University Of California, pp. 1-20.*
PC Magazine, Aug. 2002, VNU Business Publication, see pp. 106-107.
Sangay, Excel 2002, available at http://www.screenbooks.net/e/sbooks/lib9/s35/slide01.htm, published 2001. see especially pp. 4, 5 and 14.
http://sysdev.ucdavis.edu/WEBADM/deliverables/d3-/d3-4-5/d3-4-5.htm.

* cited by examiner

*Primary Examiner*—Stephen Hong
*Assistant Examiner*—Manglesh M. Patel
(74) *Attorney, Agent, or Firm*—Wolf, Greenfield & Sacks, P.C.

(57) ABSTRACT

A method and system for managing data elements with associated attributes in a computer system is described. Identifiers of each data element and information identifying the attributes of each data element are stored and the identifiers associated with each of the data elements are displayed in a list. The identifiers of the data elements are visibly associated with attributes by displaying markers in attribute strips along at least one side of the list of data elements. A user may filter the data elements according to their attributes and a filtered list of data elements may be redisplayed. This can facilitate processing of numerous data elements, simplifying processing and/or display requirements to achieve a given selection based on user criteria.

20 Claims, 13 Drawing Sheets

DATA MANAGEMENT TOOL

CROSS-REFERENCE TO RELATED APPLICATIONS

This application claims foreign priority benefits under 35 U.S.C. §§119(a)-(d) or (f) of United Kingdom patent Application No. 0220861.9 filed on Sep. 7, 2002 under the title PRESENTATION OF INFORMATION, which application is hereby incorporated herein by reference.

FIELD OF THE INVENTION

The present invention relates to the field of data management, in particular to methods and systems for user interaction with a data management system to filter and manage data.

DESCRIPTION OF THE RELATED ART

Elements of data within many systems have associated attributes and such systems may provide an interface via which a user may interact to select a data element. The system may further provide an interface via which a user may view and/or change the attributes of a particular element.

Data elements may be presented in a list format, such as in a window or a box on a computer screen which may be scrolled up and down to allow a user to view and select elements. However, for a long list of elements, the task of viewing and selecting elements becomes difficult and time-consuming.

The system may use attributes of the data elements to filter the list of elements to reduce the size of the list. For example, option buttons, search boxes, organisation into a hierarchy or a spreadsheet format may be used to reduce the size of the lists. However, each of these methods has significant disadvantages: option buttons are limited to the attributes that are predefined by the software, search boxes normally only accept words that exist in the text of the items, hierarchical methods do not work very well when it is desired to filter using attributes in combination with one another and spreadsheets can only filter lists according to the value of data fields within each item, new attributes independent of the data in the list cannot be created and allocated to items in the list for use in filtering.

SUMMARY OF THE INVENTION

Aspects of the invention are outlined in the independent claims and preferred features of the aspects are outlined in the dependent claims.

According to one aspect, there is provided a method of displaying information correlating a list of items and a list of their attributes comprising:

displaying the list of items as a column of rows, each row displaying the name of an item in the list of items;
  displaying to the side of the column a set of vertical strips extending the length of the column, each strip being associated with a different attribute of the list of attributes; and
  displaying markers in the strips at selected positions where the strips cross rows, said positions being selected in accordance with whether the item named in the crossed row has (or alternatively has not) the attribute associated with that strip;
  wherein the strips extend beyond the column of rows of items and have horizontal extensions themselves forming a column of rows, each row displaying the name of an attribute in the list of attributes.

Preferably, the method further comprises storing the name of each item in the list of items and information identifying the attributes of each item;

wherein the horizontal extensions of each attribute strip further displays a filter option indicator;
  and wherein the method further comprises receiving user input to select at least one filter option, storing the selected filter options and displaying the or each corresponding filter option indicator;
  filtering the list of items according to the or each filter option selected by the user;
  redisplaying the filtered list of items in the column of rows and the associated markers in the selected positions of the strips.

According to one aspect, there is provided a method of managing data elements in a computer system, each data element having at least one associated attribute, the method comprising:

storing identifiers of each data element and information identifying the attributes of each data element;
  displaying identifiers associated with each of the data elements in a list as a column of rows,
  displaying a set of attribute strips extending along at least one side of the column of rows, each attribute strip being associated with a possible attribute for the data element, wherein each attribute strip has a first section containing an identifier of a possible attribute of a data element, a second section comprising a filter option indicator and wherein each attribute strip further comprises attribute marker sections for each data element;
  displaying a marker in the attribute marker section of each attribute strip if the data element possesses the attribute associated with that attribute strip based on the stored data;
  receiving user input to select at least one filter option;
  storing the selected filter options and displaying the or each corresponding filter option indicator;
  filtering the data elements according to the or each filter option selected by the user;
  redisplaying the filtered data elements in the column of rows and the associated markers in the attribute marker section of each attribute strip.

Hence the data elements may be associated visibly with attributes by the markers displayed in the attribute marker sections and the user may filter the data elements according to the attributes by using the filter option indicators provided. The results of the filtering may then be displayed to the user and further filtering may be performed by the user if necessary. Hence the method may allow interactive data management and filtering of a list of data elements according to the element's attributes. As described in more detail below, the data elements may comprise, for example, font types, text articles such as encyclopaedia articles, websites, information stored on a distributed system or data files stored, for example, on a hard drive of a computer. Thus, rather than using multiple display and selection steps, a set of data elements can be displayed and selected efficiently, reducing the requirement for processing steps and display area/pages to achieve a desired data element selection. This may enable selection of data more efficiently on a simpler processing platform than with prior art processing arrangements.

An attribute may be defined for the purposes of this invention as any property of the data elements, but preferably the attributes are binary attributes, i.e., they can be either possessed ('on') or not possessed ('off') by a data element. Attributes are preferably not limited to the data in the items being listed. Use of attribute strips may allow the attributes to be listed in an easy-to-read manner separately from the list of items. Attributes may be predefined by the computer program and, in a preferred embodiment, attributes may also be defined by the user.

Preferably, the method further comprises receiving user input to create a new attribute and assign the new attribute to selected data elements. For example, as described in more detail below, a user may select an attribute strip and may be provided with a text input box, which may allow the input of the name of the new attribute. The user may then select the data elements to which he wishes to assign the new attribute, for example by clicking in the attribute marker section formed at the intersection between the attribute strip for the new attribute and the data element row.

Preferably, data elements can be filtered on the presence or on the absence of a selected attribute. Hence a user may filter the elements by positive or negative selection of attributes. However, in the case of non-binary attributes, data may be filtered based on a value or criteria, preferably by binary comparison to a threshold, for example by determining whether a value is greater than or less than the threshold.

Preferably, the data elements may be filtered using a combination of positively or negatively selected attributes. For example filtering of a list of font types may allow a user to view all fonts that are Roman (serifs) fonts of medium width that are not in heavy type.

Preferably, the method further comprises storing information indicating whether each data element possesses each attribute.

Preferably, the attribute marker sections of the attribute strips are provided at the intersection between each attribute strip and each row in the column of rows. Hence the attribute marker sections may be used to determine whether each data element possesses each attribute.

Preferably, the method further comprises allowing a user to select or deselect an attribute for a data element. Hence some selectable attributes may be added to or removed from data elements by a user.

Preferably, the attributes can be selected or deselected by setting the marker on or off in the attribute marker section at the intersection of the data element row and the attribute column. This may allow a user to set an attribute on and off for each data element with one mouse click. Alternatively or additionally, other input means, such as a keyboard, may be used to allow a user to set attributes for the data elements. Hence at least some attributes of at least some data elements may be changed by the user at the filtering interface.

Preferably, some attributes are read-only attributes and are not selectable, i.e., they cannot be added to or removed from a data element by the user. The attributes that are selectable may be identifiable on the user interface, for example they may be highlighted, for example by displaying the attribute identifier in a bold typeface or by adding a border to the attribute strip. In the embodiment of a font management system, attributes that are selectable may include attributes such as the font type, for example "Swiss" or "Roman", since many font files do not have these attributes set even though the fonts clearly belong to one group of font types. Attributes that are read-only may include attributes such as "bold", "italic" or "fixed pitch".

Preferably, the method further comprises storing a first table separately from the data elements, wherein the table comprises an identifier of each attribute and a filtering flag indicating whether the attribute has been selected for filtering.

The first table, or attribute table, may be implemented as a single table listing all attributes or may be implemented as a plurality of tables. For example, separate attribute tables may be provided for attributes displayed to the left and to the right of the screen. In addition or alternatively, separate attribute tables may be provided for each page of attributes, i.e., for each set of attributes that is displayed together on a single screen to the user.

The first table may further store a pointer to the attribute strip in which each attribute identifier is displayed. This may be particularly advantageous if all of the attributes are listed within a single table. The pointer may indicate whether the attribute is to be displayed on the left or on the right side of the screen, the order in which the attributes are displayed and on which page of attributes the attribute is displayed.

Preferably, the flag further indicates whether the attribute has been selected for filtering on the presence or on the absence of the attribute.

Preferably, the method further comprises providing a second table for storing information associated with the data elements wherein the table comprises a pointer to each data element and an attribute flag for each attribute in the first table showing whether the attribute is on or off. The second table is preferably implemented as a single table, but may alternatively be implemented as a plurality of tables.

Preferably, the method further comprises initialising the first table with attribute identifiers. Hence data may be stored in the table to allow the attribute strips to be displayed with the attribute identifiers. Pointers to attribute strips may further be stored.

Preferably, the method further comprises generating entries in the second table for each data element. As described in more detail below, each data element may have an associated identifier indicating whether it should be listed in the user display based on the filtering options selected by a user. This identifier may be updated in the second table as the filtering options are changed and may allow the display screen to be redrawn quickly without requiring the program to calculate which data elements should be displayed each time.

Preferably, the method further comprises updating the filtering flags in the first table according to input from the user. For example, the filtering details in the first table may be updated when a user selects or deselects an attribute for filtering.

According to a preferred embodiment, the method further comprises updating the attribute flags in the second table according to input from the user. Hence a user may add or remove attributes from a data element. For example, the attribute "Roman font-type" may be set for a font data element and this attribute may be added to the font data element information in the second table.

In a preferred embodiment, the identifiers of each data element comprise the names of the data elements. This may allow the data elements to be filtered using the text field of the data element identifier. For example, for a font management embodiment, the identifiers may comprise the names of the fonts and a user may search for fonts with an identifier including "Arial" by entering the text into a search box, which is preferably further provided. Storing the name of the data element as the data element identifier in an item table, described in more detail below, may allow text searching to be performed without the data element names being retrieved from each data element file on the disk. As the user enters each letter of the search term, for example into a search box provided in an attribute strip, a marker may be set against each data element that meets the criteria. If the user then selects the filter option indicator, the flags can be set against the filtered elements and the list of data elements can be quickly redrawn.

In an alternative embodiment, the identifiers of each data element further comprise an indication of the data content of each data element. For example, for a font management embodiment, the identifiers may comprise a section of text rendered in the corresponding font and displaying at least some of the attributes associated with that font (for example, the font may be displayed as bold or in narrow format).

According to one embodiment, the attribute strips may be arranged vertically down at least one side of the column of rows. This arrangement of the data elements and the attribute strips may advantageously provide a compact and easy-to-read interface for the system. In particular, this layout may allow the presence or absence of particular attributes to be displayed by attribute markers in the attribute strips for each data element.

According to a highly preferable embodiment, the attribute strips have horizontal extensions, a plurality of the horizontal extensions forming a second column of rows, wherein the horizontal extension of each attribute strip includes the first section containing the attribute identifier and the second section containing the filter option indicator.

This may allow the attributes to be listed in a compact and easy-to-read manner one above the other separately from the list of items. However, alternative layouts of the screen display may be used. For example, the attribute names and option indicators may be displayed at the top of the vertical attribute strips and the horizontal sections of the strips may be omitted or the list of data elements may be presented as a row of columns rather than as a column of rows and the attribute markers may be presented in further rows above or below the data elements.

According to a preferable embodiment, each attribute strip may be mutually visibly distinct. Each attribute strip may be patterned or shaded in a different way to distinguish it from the other attribute strips however, in a preferable embodiment, a plurality of attribute strips may be displayed in a rainbow of colours. The rainbow of colours may comprise, for example red, orange, yellow, green, blue, indigo and violet and these colours may advantageously clearly distinguish the attribute bars. In particular, each colour may allow a user to visually connect the attribute name and option indicator in the horizontal section of the attribute strip with the attribute markers.

According to one embodiment, a first set of attribute strips may extend along one side of the column of rows and a second set of attribute strips may extend along the other side of the column of rows. Hence two sets of attribute strips may be provided. One set of attribute strips, for example, the attribute strips on the left hand side, may be used for system-defined attributes and the other set of attribute strips, for example that on the right, may be used for user-defined attributes. The attributes may be arranged in different configurations, for example any user-defined attributes may simply be displayed on a different page to the system-defined attributes as described in more detail below. In an alternative embodiment, the attribute bars may be provided only on one side. This may be useful, for example if the user is viewing the system on a small screen such as the screen of a PDA. In the present embodiment, system-defined attributes are displayed in the left-hand attribute bars and user-defined attributes are displayed in the right-hand attribute bars, but the attributes may be arranged in different configurations.

Preferably, the attribute strips have horizontal extensions, a plurality of the horizontal extensions forming a further column of rows above the column of rows containing the identifiers associated with the data elements.

Preferably, the first set of attribute strips may be associated with predefined attributes, for example with system-defined attributes.

Preferably, the second set of attribute strips may be associated with user-defined attributes. Hence, a user may define attributes and then use these attributes to filter the data elements.

Preferably, the method further comprises providing a plurality of sets of attribute strips associated with a plurality of sets of attributes and providing selection means for a user to select one or more sets of attribute strips to be displayed. Hence the attributes may be displayed in one or more pages of attribute strips.

Preferably, at least three attribute strips are provided for each page of attributes. Further preferably, at least five attribute strips are provided for each page of attributes. A system could be implemented with two or fewer attributes, but other systems may also be used if there are only one or two attributes.

Preferably, fewer than about ten attribute strips are provided for each page of attributes. If more than about ten attributes are provided for each page of attributes, the user interface for viewing, managing and filtering the data may become cumbersome.

Preferably, 8 or fewer attribute strips are provided for each page of attributes. Displaying 8 or fewer attribute strips may allow the system to be coded efficiently, since up to 8 bits of information relating to binary attributes may be stored in a byte of data. If 7 attribute strips are provided, the $8^{th}$ bit of data may be used, for example as a parity bit.

In a preferred embodiment, seven attribute strips may be provided for each page of attributes. Preferably, the seven attribute strips are coloured in a rainbow of colours (red, orange, yellow, green, blue, indigo, violet). It has been found that seven attribute strips per page is an optimum number of strips to allow a user to filter the data by selected attributes whilst still providing a clear interface for a user to link easily the attribute markers relating to each data element with the attribute names and option indicators.

A further attribute strip may be provided, for example in grey, and may be used to indicate whether a particular data element is available or is installed. The further attribute strip may be arranged to remain visible irrespective of which page of attributes has been selected. The attribute strip may further be used to enable a user to install or uninstall a selected data element, for example by a user clicking on the attribute marker section formed by the intersection of the attribute strip and the data element row. Other functionality may also be provided by the further attribute strip, or in a separate attribute strip. For example, a "show/hide" functionality may be provided, which may allow direct filtering of the data elements by the user. A user may select the "show/hide" attribute for a data element positively or negatively to indicate that he wishes either to select an element for further viewing, perhaps in an expanded or more detailed view, or to select elements that he does not want to look at further. This may allow a user to positively or negatively select data elements without having to set up a specific attribute.

Preferably, identifiers of data elements that are not installed are displayed. This may allow a user to view and filter a wide range of data elements without taking up significant system resources by installing every data element. For example, for a font management system, both installed and uninstalled fonts may be displayed in the list of data elements. This may allow a user to organise and filter a large collection of fonts, in one embodiment thousands of fonts, while keeping only a relatively small number of fonts, in one embodiment hundreds of fonts, installed at any one time. This may provide greater efficiency for the operating system and may allow the method and system to work within the limits of the computer operating system. For example, in most systems, there is a physical limit (imposed by the size of the Registry) of about 1000 on the number of font files that can be stored at any one time. Programs within these systems that display fonts generally only display the fonts that are installed whereas the present method and system may also display uninstalled fonts, which may provide the user with a greater choice of fonts.

Preferably, each row in the column of rows displays various information pertaining to the item, wherein the first and second sections of the attribute strips comprise a set of horizontal differently coloured strips set one above the other across the top of the column of rows and the attribute marker sections comprise a matching set of vertical coloured strips down one or both sides of the column of rows, and wherein the horizontal and vertical strips enclose the column of rows, each vertical strip forming a right-angle with its correspondingly coloured horizontal strip, together forming a rectangular approximation to a rainbow;

wherein the identifier of a possible attribute for the data elements comprises the name of an attribute that the data elements may possess and wherein the filter option indicator allows filtering of the list on the presence or absence of the attribute;

wherein the attribute marker sections comprise the rectangles formed by the intersection of a vertical coloured strip and a horizontal item row;

wherein the method further comprises using this rectangle, where the user is allowed to set the attribute, to accept a mouse click from the user to toggle the attribute on or off for the data element;

wherein the method further comprises:

allocating a first table separately from the data elements to be listed, each element of the first table to contain an attribute name, a pointer to the coloured strip the name is to appear on, and a flag indicating whether the attribute has been selected for filtering, and if so whether positively or negatively;

allocating a second table for storing as many second table elements as there are data elements to be listed, each second table element containing a pointer to the data element, as well as a flag for each attribute in the first table showing whether the attribute is on or off;

initialising the first table with attribute names and pointers to coloured strips;

generating entries in the second table for each data element to be listed;

updating the filtering flags in the first table according to input from the user;

updating the attribute flags in the second table according to input from the user;

displaying the attributes together with the list of data elements or a subset thereof according to the two tables.

According to a further aspect, there is provided a font management tool comprising:

means for displaying identifiers associated with a plurality of fonts;

means for displaying attributes of each of the fonts;

means for selecting one or more attributes on which to filter the fonts;

means for filtering the fonts according to the selected attributes;

means for redisplaying the identifiers associated with the filtered fonts.

Preferably, the font management tool further comprises means for receiving user input to create a new attribute and assign the new attribute to selected fonts.

According to a further aspect, there is provided a file management tool comprising:

means for displaying identifiers associated with a plurality of files;

means for displaying attributes of each of the files;

means for selecting one or more attributes on which to filter the files;

means for filtering the files according to the selected attributes;

means for redisplaying the identifiers associated with the filtered files.

Preferably, the file management tool further comprises means for receiving user input to create a new attribute and assign the new attribute to selected files.

Preferred features of the method aspect may be applied to the font management tool and file management tool aspects and corresponding advantages may be provided.

Apparatus and systems for carrying out the methods described herein may further be provided. In particular, a computer program may be provided comprising instructions for carrying out a method described herein and computer program products and computer-readable devices including instructions for carrying out the methods described herein may further be provided.

Modifications of detail will be apparent to one skilled in the art and may be provided. Preferred features of one aspect may be applied to other aspects of the invention and may be provided independently unless otherwise stated.

BRIEF DESCRIPTION OF THE DRAWINGS

A description of embodiments of the invention now follows with reference the drawings in which.

DESCRIPTION OF THE PREFERRED EMBODIMENTS

One preferred embodiment of the system and method will now be described. The method comprises three main elements; a screen display, in this embodiment a specific format of screen display is used which may be termed the "rainbow interface", tables, which may be stored internally in computer memory, and instructions to enable a computer program to allow a user to operate the interface by use of the tables.

While the preferred embodiment of the present invention is disclosed in the context of a font management application, those skilled in the art will appreciate that the principles of the present invention may be applied to any list of items for which attributes can be defined. For example, the data elements may be pages of a website which may have attributes defined, for example by metatags or by the text or content of the page. Hence one embodiment of the present invention may be used as a search engine to filter websites with particular attributes or content. In an alternative embodiment, the data elements may be used to filter text elements, for example encyclopaedia articles, newspaper articles or journal articles, which may have attributes such as the contents and subject matter, the date on which the article was written, the author of the article and the publication in which the article was published. In a further embodiment, the data elements may comprise files on the hard drive of a computer, or stored on a distributed network. Attributes of such files may include the file type, the date of creation or modification of the file or an identifier of the creator of the file. Further applications of the system described herein in relation to the font management application are obvious to one skilled in the art.

Figure 1:
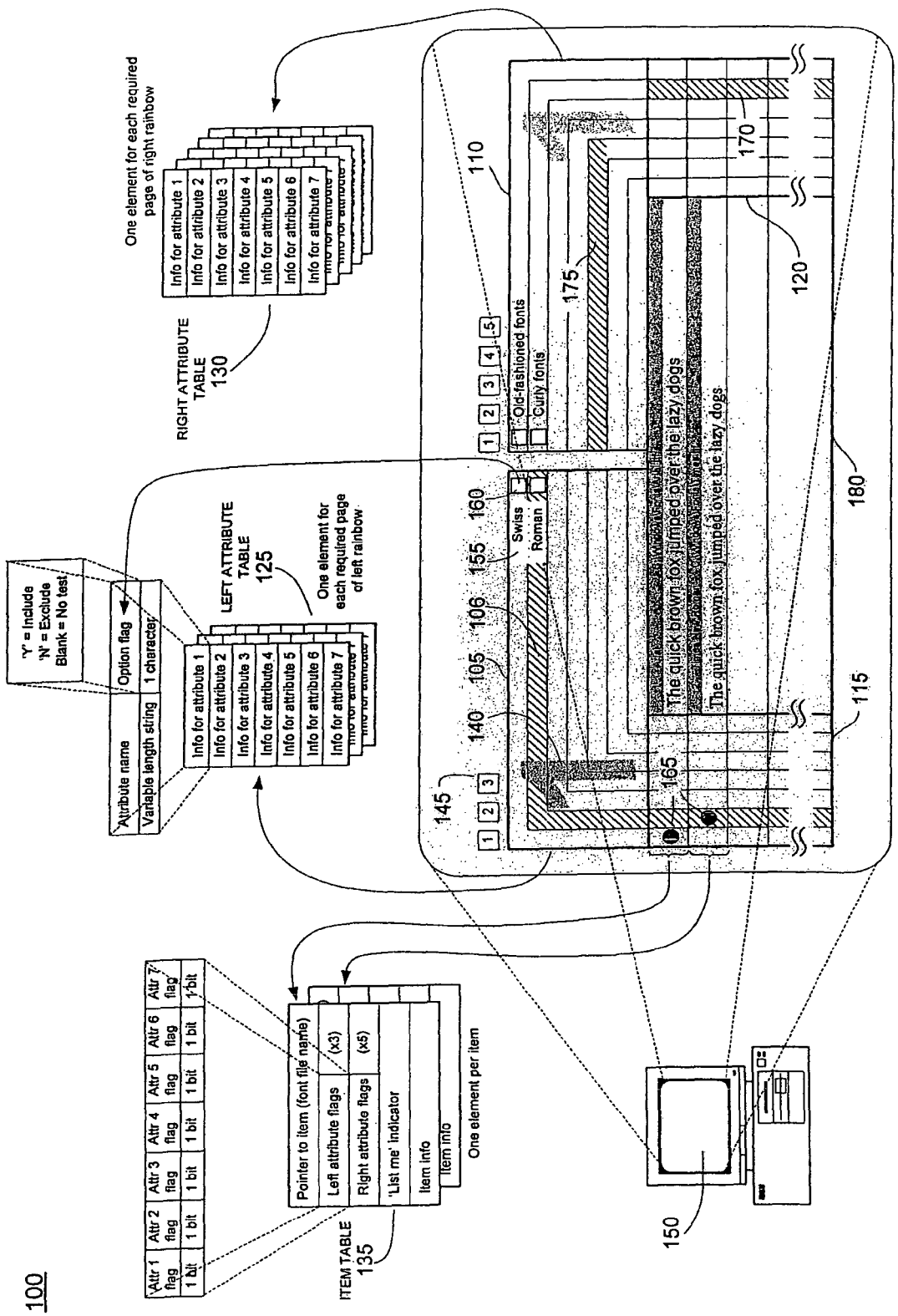
FIG. 1 is a schematic diagram illustrating a screen display and associated tables according to one embodiment.

Referring now to FIG. 1, which illustrates one embodiment of a screen display for a font management application, the relationship between the various screen areas of the 'rainbow interface' and the underlying internal tables is shown. In one embodiment of the system 100, a screen display 150 is maintained in conjunction with a left attribute table 125, a right attribute table 130, and an item table 135.

Referring to the screen display 150, the items to be listed, for example data elements such as fonts, are arranged in the centre of the display in area 180. The items in the list may be numbered and the total count of items in the list may be displayed. The total count may be refreshed when the user makes a change to any of the option boxes contained in the horizontal attribute strips above the list of items 180.

In the present embodiment, the names of the attributes 155 are arranged in horizontal rows, or attribute strips, across the top of the display, the system-generated attributes in the left area 105, and the user-defined attributes in the right area 110. Markers 165 for each attribute are displayed in vertical rows in areas 115 and 120. A coloured background strip 106 links each marker with its attribute (forming a right-angle between them). In a preferred embodiment of the present invention, these coloured background strips may be arranged to form a rectangular approximation to a rainbow, which, in this embodiment, is divided into a left half and a right half. In a preferred embodiment, as shown in FIG. 1, seven attribute strips 106 are displayed per screen view, although more or fewer strips may be displayed in alternative embodiments as discussed in more detail below. In order to allow more than seven system-generated attributes, and more than seven user-defined attributes, each half of the rainbow may be used to display a plurality of sets of seven attributes, each set being referred to as a 'page'. Pages of left rainbow may be displayed as required in the present embodiment by use of the command buttons 145, and the same method with a different set of navigation buttons may be provided for the right rainbow.

In a preferred embodiment, the user may make up his own attributes, each of which may be displayed on a horizontal coloured strip 175 on the right side of the rainbow along with its option indicator. In a preferred embodiment, the user may establish a new attribute by clicking in a horizontal coloured strip 175 which does not already have an attribute associated with it. The user may then define a name and properties for the attribute. Preferably, the user can use the option indicators for the user-defined attributes to search according to these attributes.

In one embodiment, the user may set any attribute on or off for an item by clicking in a vertical coloured strip 170 (on either side of the rainbow) in the rectangle formed by the intersection of the vertical coloured strip and the horizontal row containing the item he wishes to affect. If the attribute is currently 'on', signified by a marker being shown in the rectangle, it will be toggled to 'off', and vice-versa. Hence in the present embodiment, each rectangle formed by the intersection of a vertical coloured strip and a horizontal item row thus effectively becomes an individual 'control button', allowing attributes to be set on or off, for example with a single mouse click.

Referring now to the relationship between the screen display areas and the internal tables, the attribute names 155 from each page of the left rainbow may be stored internally in one element of the Left Attribute table 125, and those from each page of the right rainbow may be stored in one element of the Right Attribute table 130. In the present embodiment, each element of these tables contains seven occurrences of attribute information. Each of these occurrences may contain at least a text field, in which is stored an attribute name, and also an option flag which is an internal representation of the attribute's option indicator 160. The position of the attribute name and option flag within these seven occurrences may be arranged to equate to the position of these items on the rainbow. For example, an attribute in the first occurrence may appear in the first (for example, a red) coloured strip. An empty attribute name field in any of the seven occurrences may be used to indicate that no attribute should be displayed on the respective coloured strip. By the use of such empty fields, attributes may be 'grouped' as desired; for example a rainbow page might display the three attributes 'Narrow', 'Medium', 'Wide', followed by an empty row, followed by the three attributes 'Light', 'Medium', 'Heavy'.

In the present embodiment, another table, the 'Item table' 135, is used to hold information about, and a pointer to, the items in the list. One element of this table may hold information relating to one item, including all 'left rainbow' attribute flags and all 'right rainbow' attribute flags. In the preferred embodiment of the present invention, each entry in the Item table contains 4 fields of significance to the invention, which are as follows:

| A pointer to the item | The path and file name of the font file. |
| --- | --- |
| 'Left rainbow' attribute flags | As many sets of 7 1-bit attribute flags as there are allocated pages of left rainbow. |
| 'Right rainbow' attribute flags | As many sets of 7 1-bit attribute flags as there are allocated pages of right rainbow. |
| A 'list me' indicator | A Boolean value to indicate whether the item should be listed according to the option indicator settings and the item's attribute settings. |

In addition to the four fields listed above, several extra fields may be stored which may hold copies of various pieces of information relating to each font. These fields may be used to increase the speed of filtering by saving file accesses.

Use of this item table to 'drive' the display of the list on screen, as well as storing the attribute flags, may allow for faster filtering and scrolling than would be obtained if the program had to traverse the items themselves, as the item pointers stored in the table allow the program to access the items directly (for example, font files) without having to search for them.

A method of managing and filtering the data elements according to one embodiment will now be described in more detail with reference to FIGS. 2 to 9.

Figure 2:
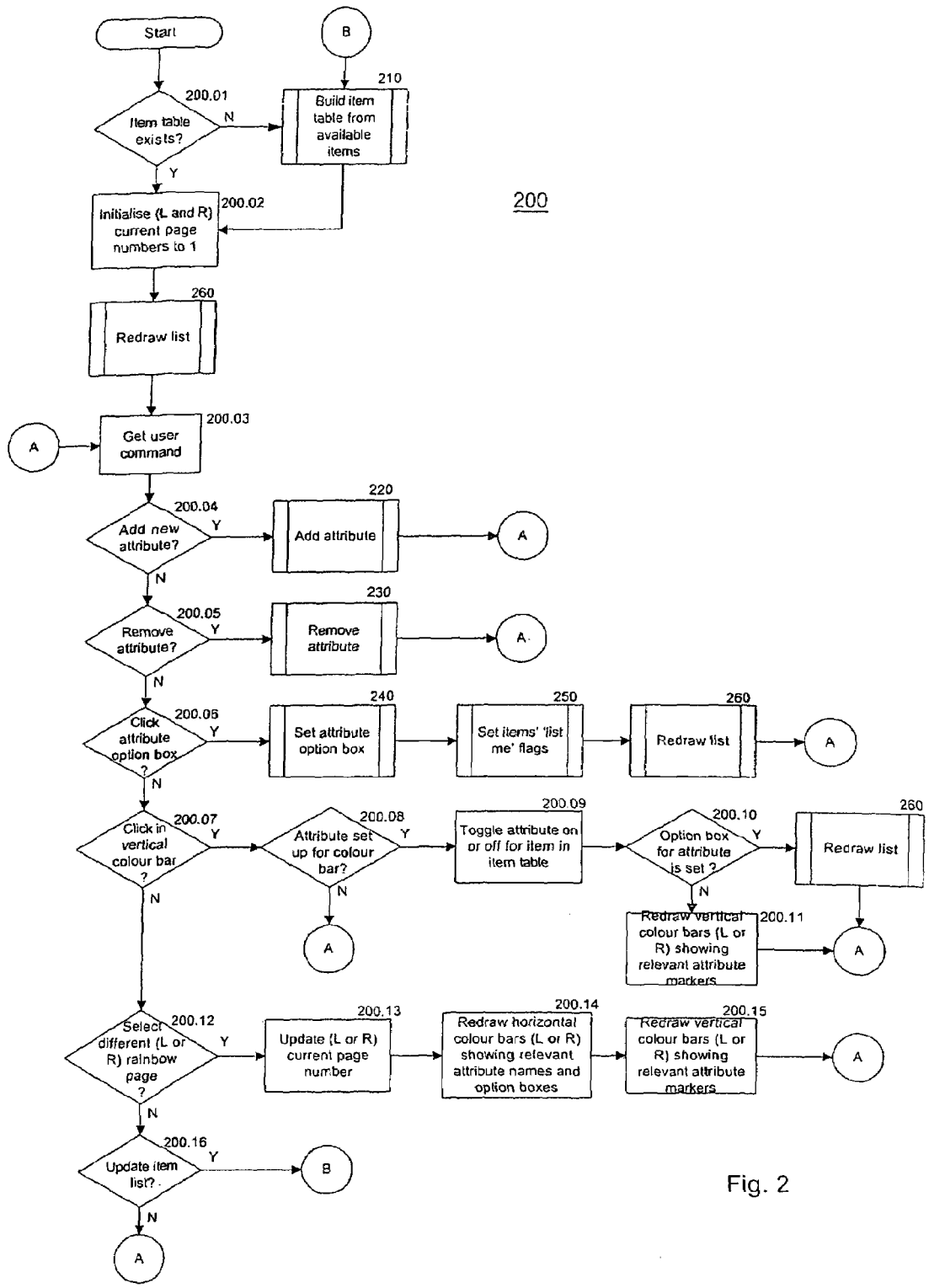
FIG. 2 is a flow diagram illustrating a method of generating and operating a system according to one embodiment.

Referring now to FIG. 2, the drawing shows one embodiment of high-level logic which may be implemented in a program according to the invention. According to a preferable embodiment, an internal table of items may be maintained separately from the items themselves and, if the system is implemented in this way, the program should first check, when it is started up, that this table exists 200.01. For example, when the program is first run after being installed, the table of items will not have been created yet. If it does not exist, control may pass to process 210 by which available items may be scanned and the table created. In a preferred embodiment, this process may also be invoked by the user, for example when new font files are loaded onto the hard drive, in which case the table can be updated to show these new files.

Once the normal program initialisation is done (200.02 and process 260), control may pass to item 200.03 to wait for a user command. A user may scroll the list of items in the display up or down by methods that are well known to view the items.

User actions may be tested for in the present embodiment by items 200.04, 200.05, 200.06, 200.07, 200.12, and 200.16, which are outlined separately below.

200.04 Control may pass to process 220 if a 'add new attribute' command is detected.

200.05 Control may pass to process 230 if a 'remove attribute' command is detected.

200.06 Processes 240, 250, and 260 may be invoked if a user clicks in an attribute option indicator 160.

200.07 If the user clicks in a vertical colour bar 170 then a further test 200.08 may be performed to see if an attribute has been set up for the colour bar clicked on, no action being taken if it has not, and the attribute being toggled on or off (item 200.09) if it has. This 'toggling' process may necessitate a further check 200.10 to see whether the option indicator relating to this attribute is set, or in other words whether the user is filtering the list on this attribute. If not, then the items in the list may remain in place, and the only screen redrawing which needs to be done is to remove or display the attribute marker in the relevant vertical colour bar. This may allow the screen redrawing process (and therefore the response to the user) to be much faster than a complete redraw of the screen. This feature may be particularly advantageous in the case of the present font type embodiment, where rendering of various lines of text in different fonts may be very time-consuming. If however the attribute that has been toggled is being used as a filter, then the item whose attribute has been reversed must not now appear in the displayed list, and a complete screen redraw (process 260) may be performed.

200.12 This action may allow the user to select a different set of seven attributes for display (either left or right). The program steps that may be implemented are 200.13 to update the program's internal pointer to the current visible rainbow page (either left or right in this embodiment), 200.14 to present a new set of attribute names and option indicators, and 200.15 to present a new set of attribute markers. In the present embodiment, this action does not change the actual item information listed in area 180.

200.16 Because the item table (containing pointers to the items) may be held separately from the items themselves, the table is preferably updated whenever the items being pointed to change. If this is not done, it is possible that the program will not be able to resolve a pointer when it comes to display an item which has been moved or deleted. In the preferred embodiment, if this happens, a suitable error message may be displayed suggesting that the user take this option to update the program's table. Process 210 may be invoked, the screen re-initialised, and the program waits for further user input. In the present embodiment, a command button is provided to allow the user to take this option so that the list can reflect for example new font files which are loaded onto the computer's hard drive. The list of the present embodiment may cover all font files on a drive.

Figure 3:
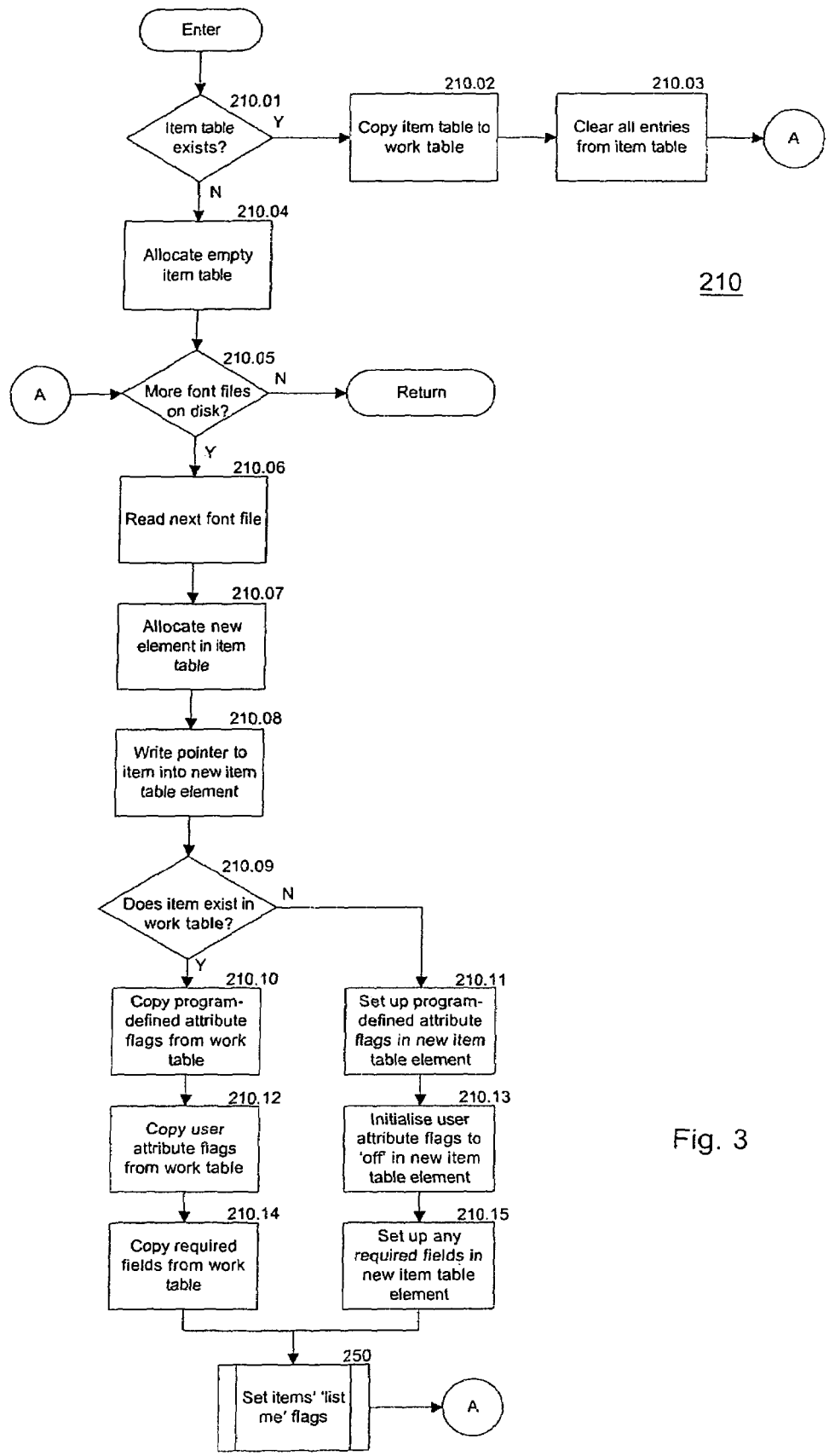
FIG. 3 is a flow diagram illustrating one embodiment of a method of building an item table from available items.

Referring now to FIG. 3, process 210 may be invoked to build an internal item table from all available items. In the preferred embodiment, 'all available items' means all font files on a particular computer disk drive, but it will be appreciated that the scope of this expression could encompass any group of items which could be repeatedly searched for, and for which pointers can be established. Other examples might include websites, encyclopaedia articles, or even all the files on a drive as discussed above. These items could then be organized according to their attributes in the manner of a relational database, rather than in a hierarchy of folders as is commonly the way at present.

A test 210.01 may be made to see if the item table exists. In the preferred embodiment, the table will not exist the first time the program is run after being installed. If it does exist, it may be copied away to a work table before being cleared down ready to be created afresh. (210.02 and 210.03). Otherwise, an empty table may be allocated 210.04. In the preferred embodiment, the table may be created as a C++ Collection, which allows memory to be dynamically allocated as each new element is added. For each new item found, a table element may be allocated and a pointer to the item written into it (210.06, 210.07 and 210.08). Control may then return to the invoking process when all available items have been processed (210.05). Each item found may be looked up in the work table created earlier 210.09. If found, the attribute flags may then be copied from the work table into the newly created item (210.10 and 210.12), thus preserving the settings of the user attribute flags for the item, and saving the work of calculating the settings of the system attribute flags. Any additional information may also be copied 210.14. If the item was not found in the work table, then the program-defined attribute flags may be calculated 210.11, the user attribute flags set to 'off' 210.13, and any additional information set up 210.15. Once all other table items are in place, the item's 'list me' flag may be calculated by process 250 and the next available item may be sought.

Figure 4:
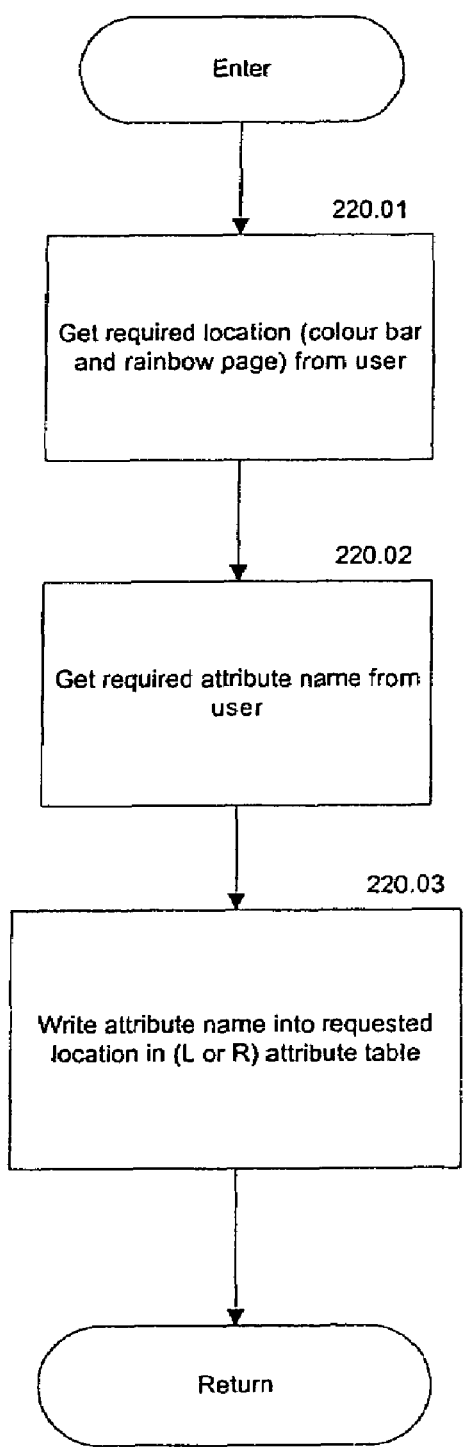
FIG. 4 is a flow diagram illustrating one embodiment of a method of adding an attribute.

Turning to FIG. 4, one embodiment of a process for adding a user-defined attribute 220 will now be described. The required location, for example the colour bar and rainbow page may be obtained by user input 220.01 and a required attribute name may also be obtained from a user 220.02. The attribute name may then be written into the requested location in the left or right attribute table 220.03.

Figure 5:
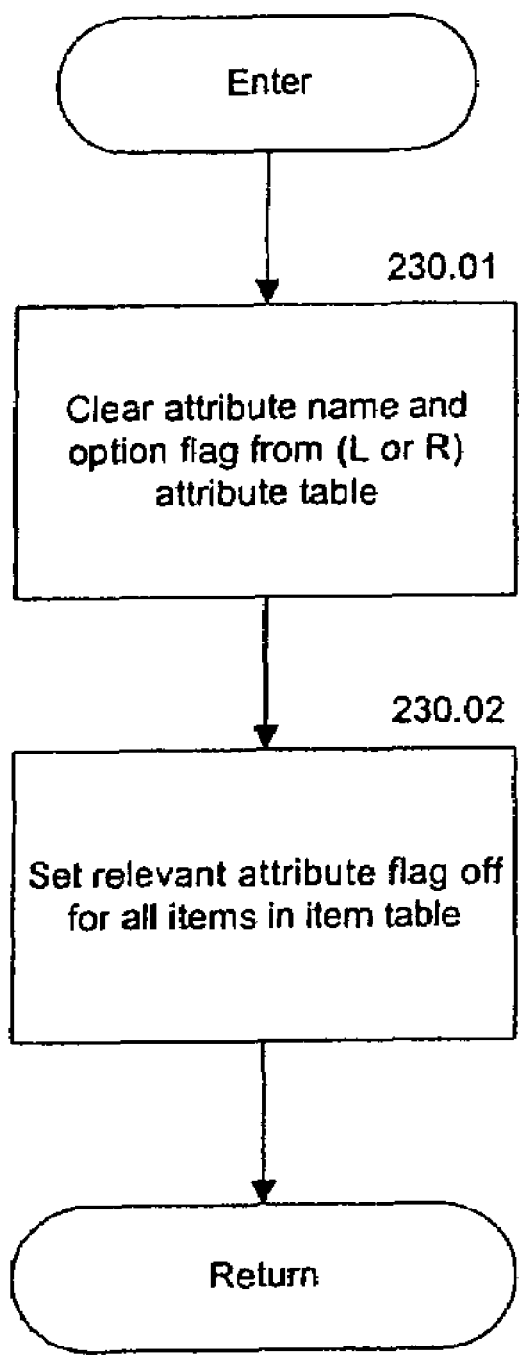
FIG. 5 is a flow diagram illustrating one embodiment of a method of removing an attribute.

Referring to FIG. 5, a process for removing an attribute will now be described. The attribute name and option flag may be cleared from the left or right attribute table 230.01 and the relevant attribute flag may be set to "off" for all items in the table 230.02.

Figure 6:
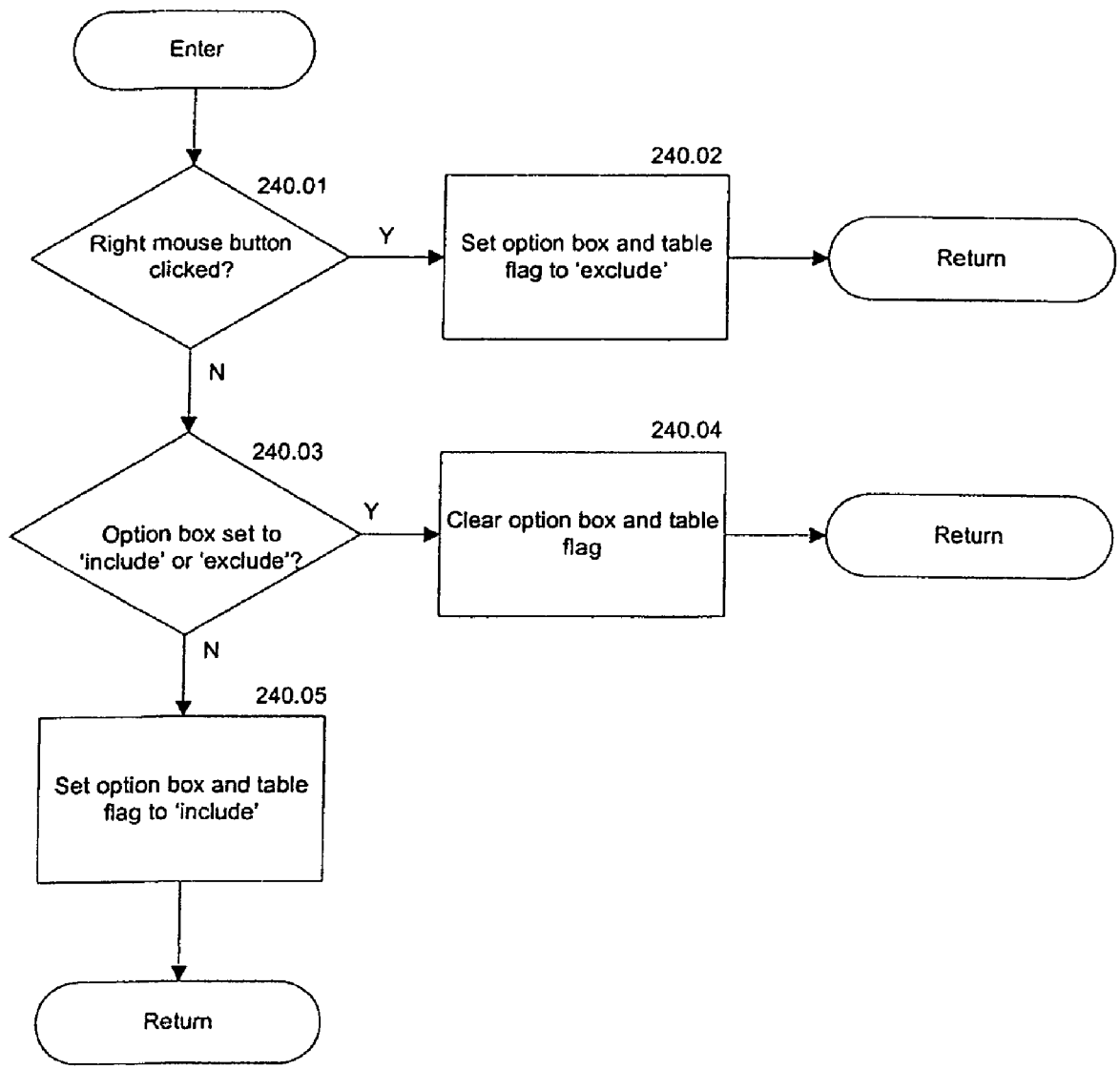
FIG. 6 is a flow diagram illustrating one embodiment of a method of setting the attribute option indicator.

FIG. 6 describes one embodiment of a process 240 which may be invoked to set the attribute option indicator. The process is the one adopted by a preferred embodiment, and alternative methods will be apparent to one skilled in the art. The general object may be to provide a mechanism by which an option indicator can be set either positively (to specify that items listed must possess the attribute concerned) or negatively (to specify that items listed must not possess the attribute). The preferred embodiment uses a left mouse click to set the option positively if it was clear, or else to clear it if it was already set. A right mouse click may be used to set the option negatively, whether the option was clear or already set positively.

Figure 7:
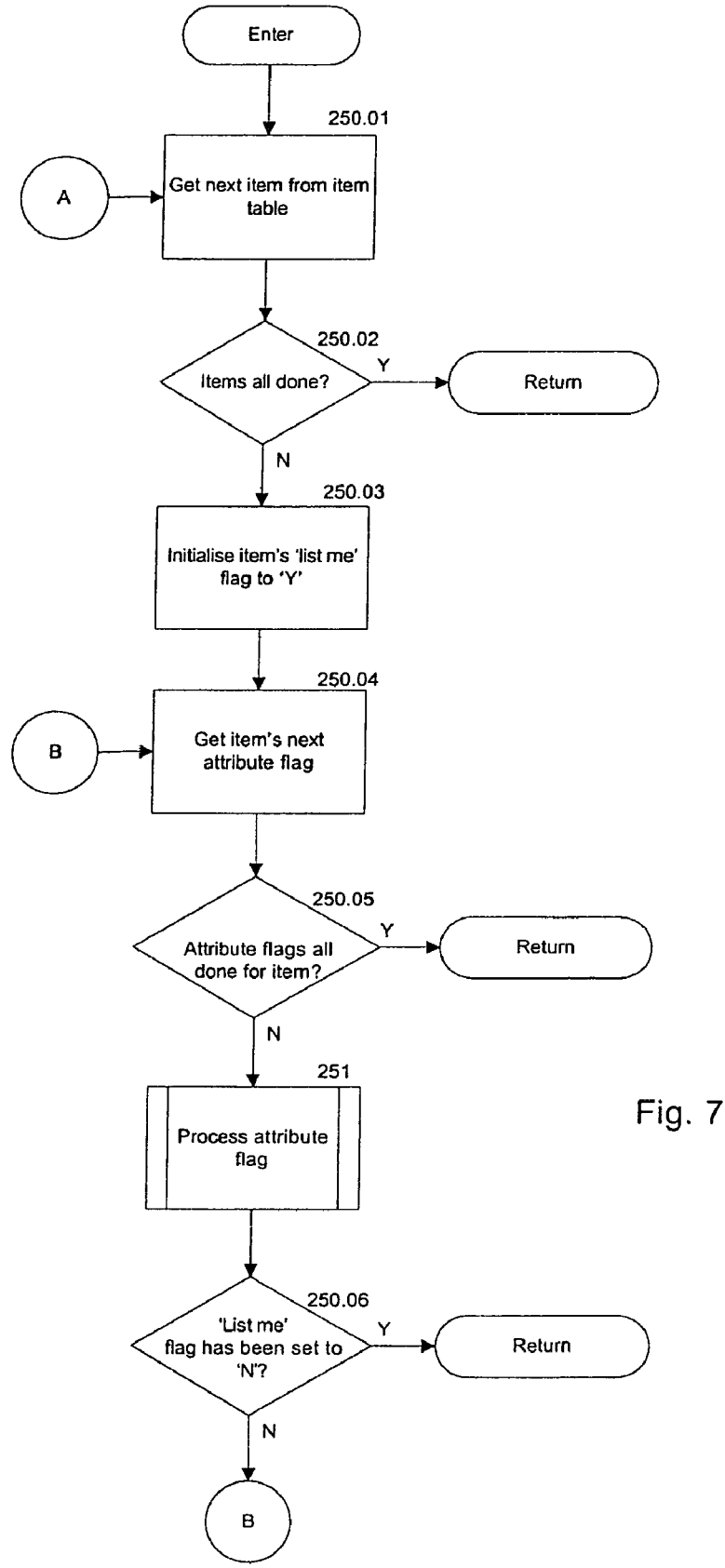
FIG. 7 is a flow diagram illustrating one embodiment of a method of setting the items' "list me" flags.
Figure 8:
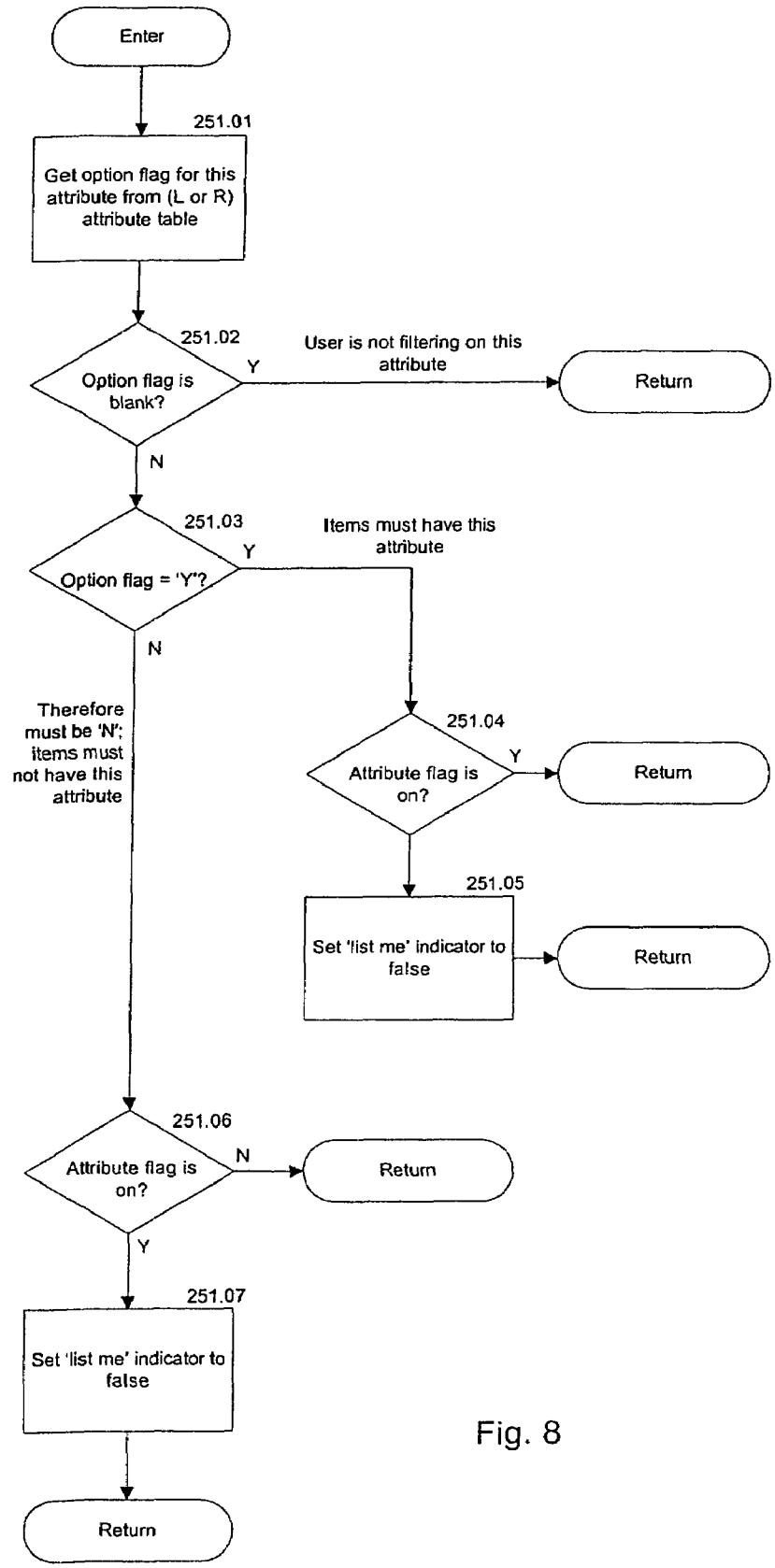
FIG. 8 is a flow diagram illustrating one embodiment of a method of processing the attribute flag.

Referring now to FIG. 7 and FIG. 8, which may be read together, the process 250 and its sub-process 251 may be invoked to set the table items' 'list me' flags. This may be done by comparing each attribute's option flag with its respective flag setting in each item. In more detail, to set an item's "list me" flag 250, the item may be obtained from the item table 250.01 and the item's "list me" flag may be initialised to a default position of "Y", indicating that the item should be listed. Attribute flags for the items may be successively obtained 250.04, 250.05 and each attribute flag may be processed 251 to determine whether that attribute has been selected for positive or negative filtering. Based on this processing 251, the "list me" flag of the item may be left as "Y" or may be set to "N" to indicate that the item should not be listed.

Turning to FIG. 8, an example of a method of processing the attribute flags (corresponding to process 251 of FIG. 7) will now be described in more detail. The option flag for each attribute may be retrieved from the left or right attribute table 251.01 and the process may determine whether the option flag is blank 251.02. If it is blank, the user is not filtering on this attribute and a further attribute flag may be retrieved. If the option flag is not blank, then the process determines whether the option flag is positive ("Y") 251.03, if it is positive, then, according to the present embodiment, listed items or elements must have this attribute. If the attribute flag for a particular element 251.04 is on, the "list me" indicator should be left in the default "Y" position or set to this position. If the attribute flag is not on, then the "list me" indicator should be set to false 251.05. Returning to process 251.03, if the option flag is not positive and not blank, then it must be negative. The process determines whether an attribute flag is on for a particular element 251.06. If the attribute flag is not on, the "list me" indicator remains at its default "Y" value, if the attribute flag is on, the "list me" indicator is set to false 251.07.

Figure 9:
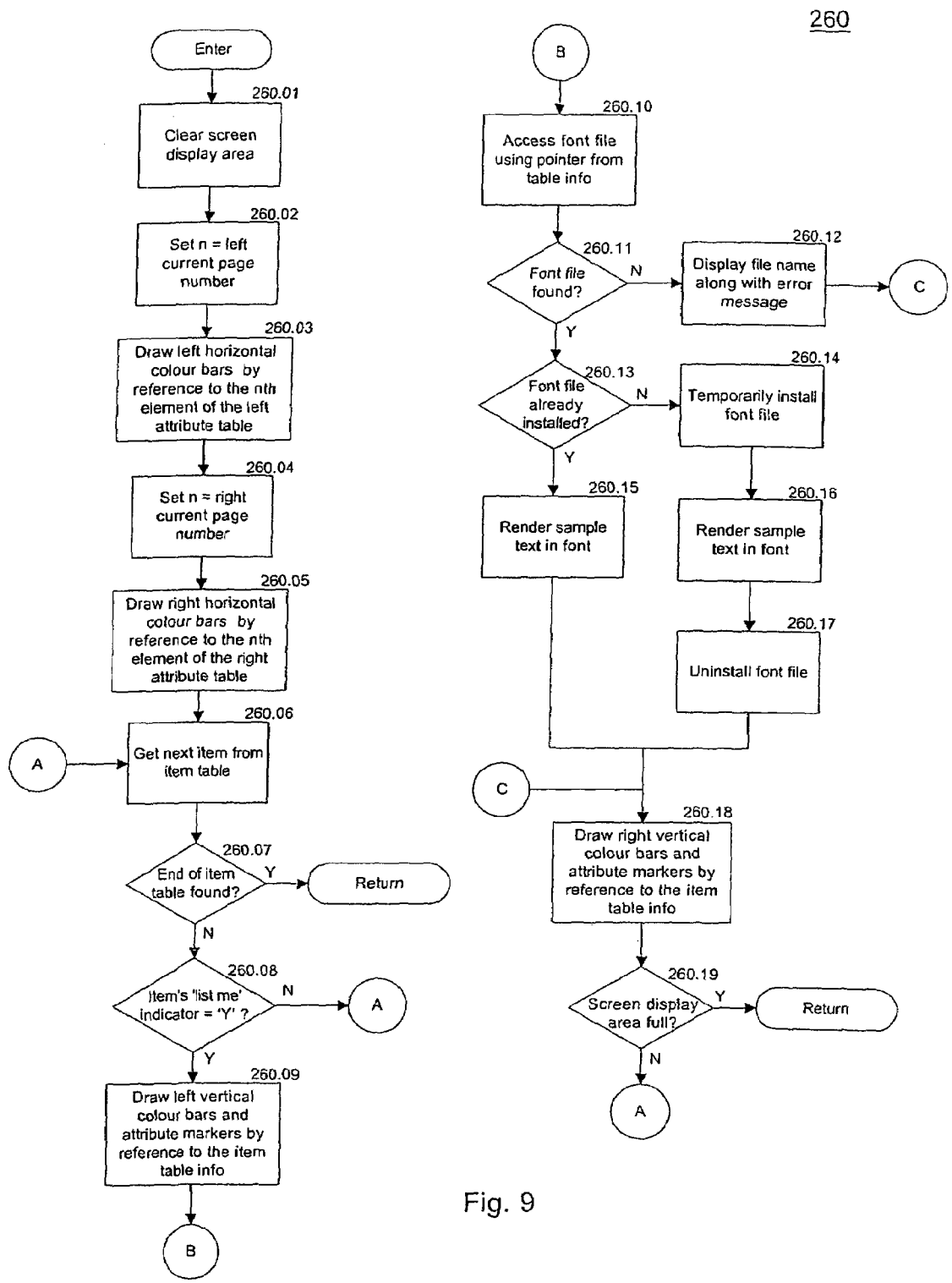
FIG. 9 is a flow diagram illustrating one embodiment of a method of redrawing the display area.

Referring now to FIG. 9, process 260 may be invoked to perform a complete redraw of the screen display, which comprises, in this embodiment, the horizontal coloured strips at the top, the vertical coloured strips at each side, and the items themselves in the middle. In some embodiments, the screen may not be entirely redrawn, for example elements such as the horizontal coloured strips at the top may not be redrawn.

The screen display area may be cleared 260.01 and the current page numbers (n) for the left and right attribute bars (See FIG. 1, 140) may be set 260.02, 260.04. The horizontal sections of the left attribute bars may be drawn with reference to the nth elements of the left attribute table. Successive items or elements may then be obtained from the item table 260.07 and the process may determine whether the item's "list me" indicator is set to positive ("Y") 260.08. In the present embodiment, if the "list me" indicator is not positive, then the item is not displayed. If the "list me" indicator is positive, then the item is displayed and the vertical colour bars and attribute markers for that data element may be displayed with reference to the attribute information in the item table 260.09. The font file may be accessed using a pointer or link in the item table 260.10. If the font file is not found, the file name may be displayed with an error message 260.12. If the font file is found, the process may determine whether the font has been installed 260.13. If the font has been installed, a sample text may be rendered in that font 260.15 and may be displayed to the user. If the font file has not been installed, font file may be installed temporarily 260.14 and sample text may be rendered in the font 260.16. The font file may then be uninstalled from the system 260.17. This may allow uninstalled fonts to be displayed. In an alternative embodiment, an error message may be displayed to the user if the font has not been installed. The right vertical colour bars and the attribute markers may then be displayed with reference to the item table information 260.18. The process may finally check whether the screen display area is full 260.19 and may continue to process items or elements of data until it is full.

A description of one embodiment of a display layout which may be produced by the system described herein is now provided. This description is not intended to be limiting and alternative layouts and may be implemented.

A method of correlating a list of items and a list of their attributes is described herein and may comprise:
  a) displaying the list of items as a column of rows, each row displaying the name of an item in the list of items,
  b) displaying to the side of the column a set of vertical strips extending the length of the column, each strip being associated with a different attribute of the list of attributes, and
  c) displaying markers in the strips at selected positions where the strips cross rows, said positions being selected in accordance with whether the item named in the crossed row has (or alternatively has not) the attribute associated with that strip. Each strip of the set of strips may be displayed in a distinctive colour, for example the colours of the rainbow.

The strips may extend beyond the column of rows of items and have horizontal extensions themselves forming a column of rows, each row displaying the name of an attribute in the list of attributes.

A first set of strips may extend along one side of the column of rows displaying the names of the list of items and a second set of strips each strip of which is associated with a different attribute of a further list of attributes may extend along the other side of the said column of rows. The strips of the second set of strips may extend beyond the column of rows of items and may have horizontal extensions themselves forming a second column of rows, each row may display the name of an attribute in the further list of attributes.

A plurality of alternative sets of strips may be made available and selection means may then be displayed for selecting any one set of said alternative sets for display.

Display means for carrying out the method described above may also be provided and are described herein.

Figure 10:
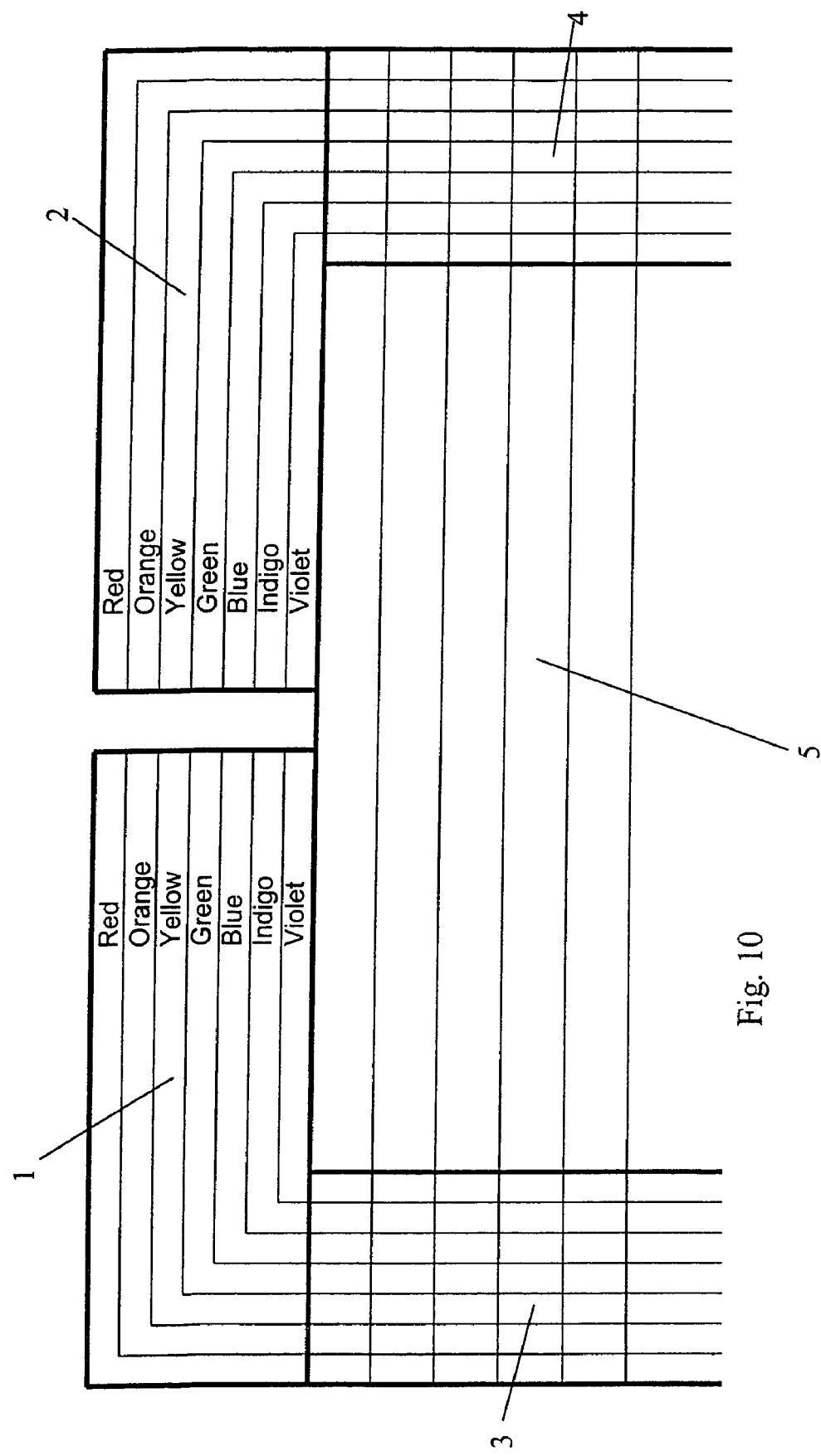
FIG. 10 shows the top half of one embodiment of a display showing two sets of strips for listing attributes and provision for a column of rows for listing items.

Referring to FIG. 10, the five main areas of one non-limiting embodiment of a display, the respective areas being referenced 1, 2, 3, 4 and 5. Areas 1, 2, 3 and 4 are each made up of seven strips in the colours of the rainbow. Areas 1 and 2 comprise two sets of seven strips arranged horizontally across the top of the display. Area 1 on the left is used to display those attributes pre-allocated by a computer program. Area 2 on the right is used to display any attributes created by the user. The third and fourth sets of colour strips 3 and 4 are arranged beneath the horizontal sets to form a rectangular approximation to a rainbow. These sets of vertical strips 3 and 4 are used to display markers against each item in a list of items where an attribute is present, as well as to accept mouse clicks from the user to toggle attributes on and off. The fifth area 5 is placed inside the approximate rainbow formed by areas 1 to 4. Area 5 contains a column of rows in which the names of a list of items are placed. In the example considered the items comprise fonts and their names are displayed row by row.

The names 10 of the attributes of fonts are displayed on the horizontal colour strips in the top of the display, e.g., in the right part of display area 1 and/or in the left part of display area 2 (FIG. 10). Alongside each attribute name is an option box 11 inside which the user can click to filter the list of items having that attribute, either negatively or positively. For example a left mouse click would select only font names possessing the attribute, and a right mouse click would select only font names not possessing the attribute. Option box 11 displays any current selection status 14, for example a tick for positive selection or a cross for negative selection. In order to toggle an attribute on or off the user clicks in the rectangle 13 formed by the intersection of the appropriate vertical colour strip and the horizontal item display.

Figure 11:
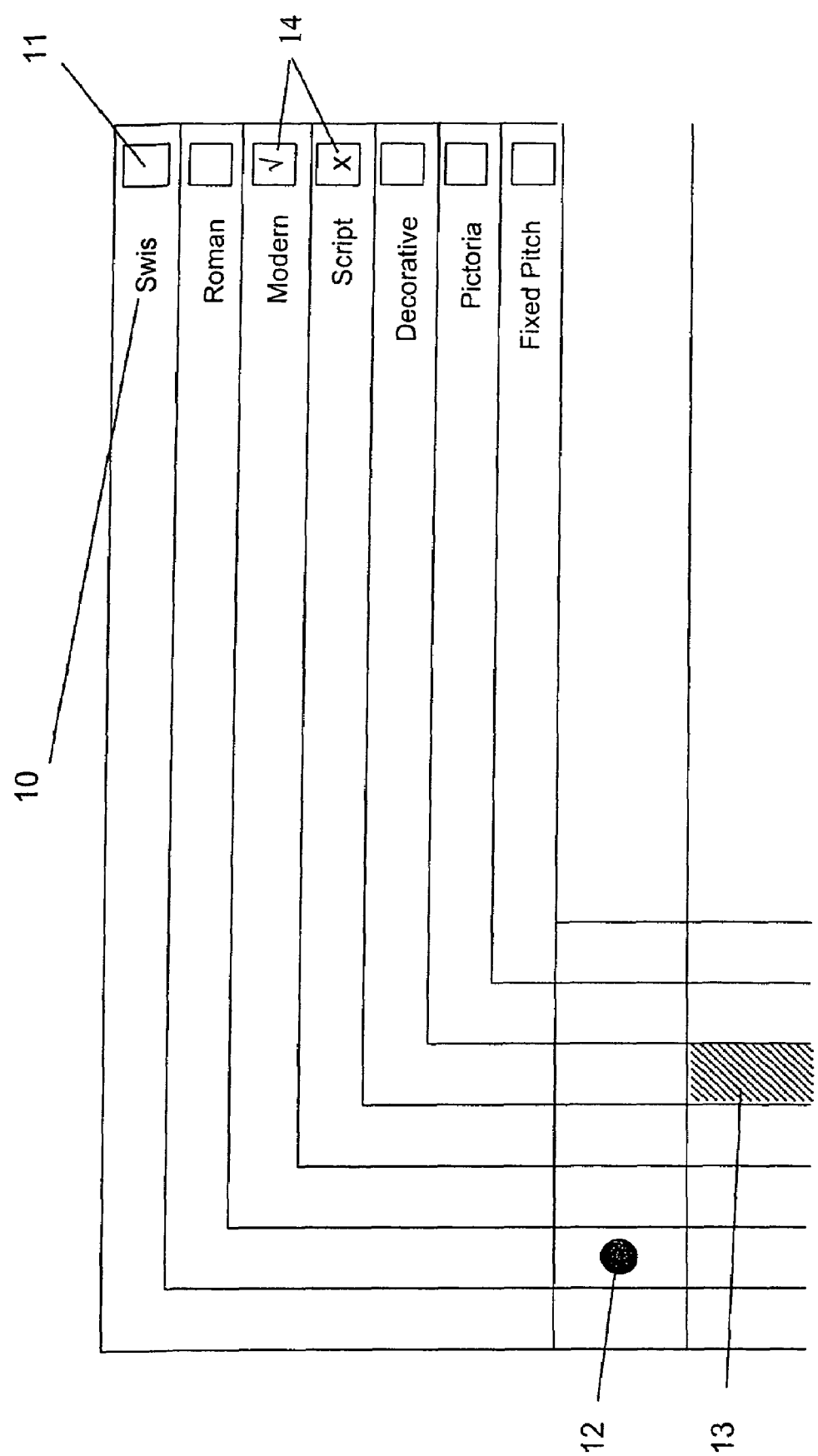
FIG. 11 shows the top left-hand corner of one embodiment of a display.
Figure 12:
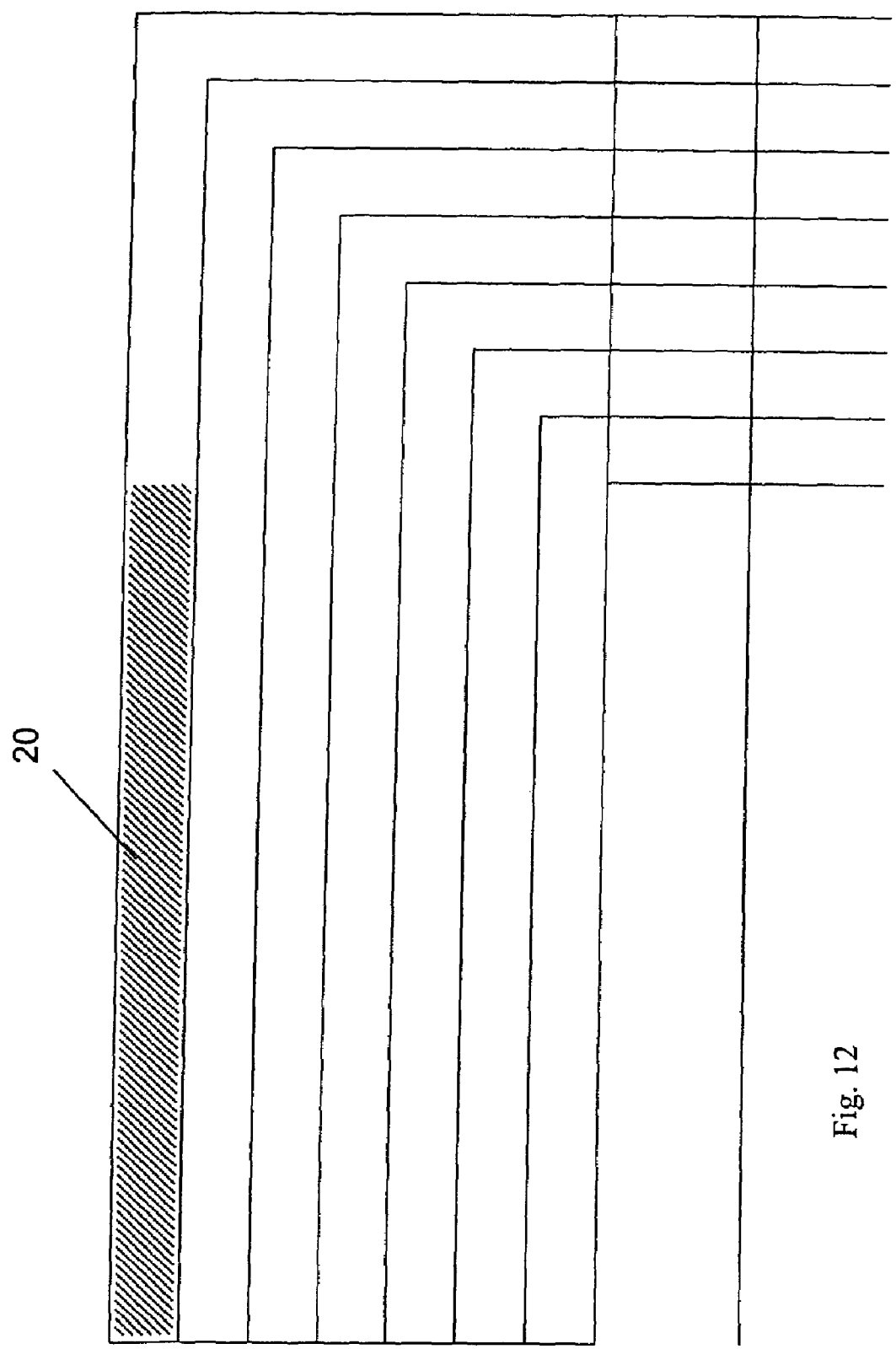
FIG. 12 shows the top right-hand corner of one embodiment of a display.
Figure 13:
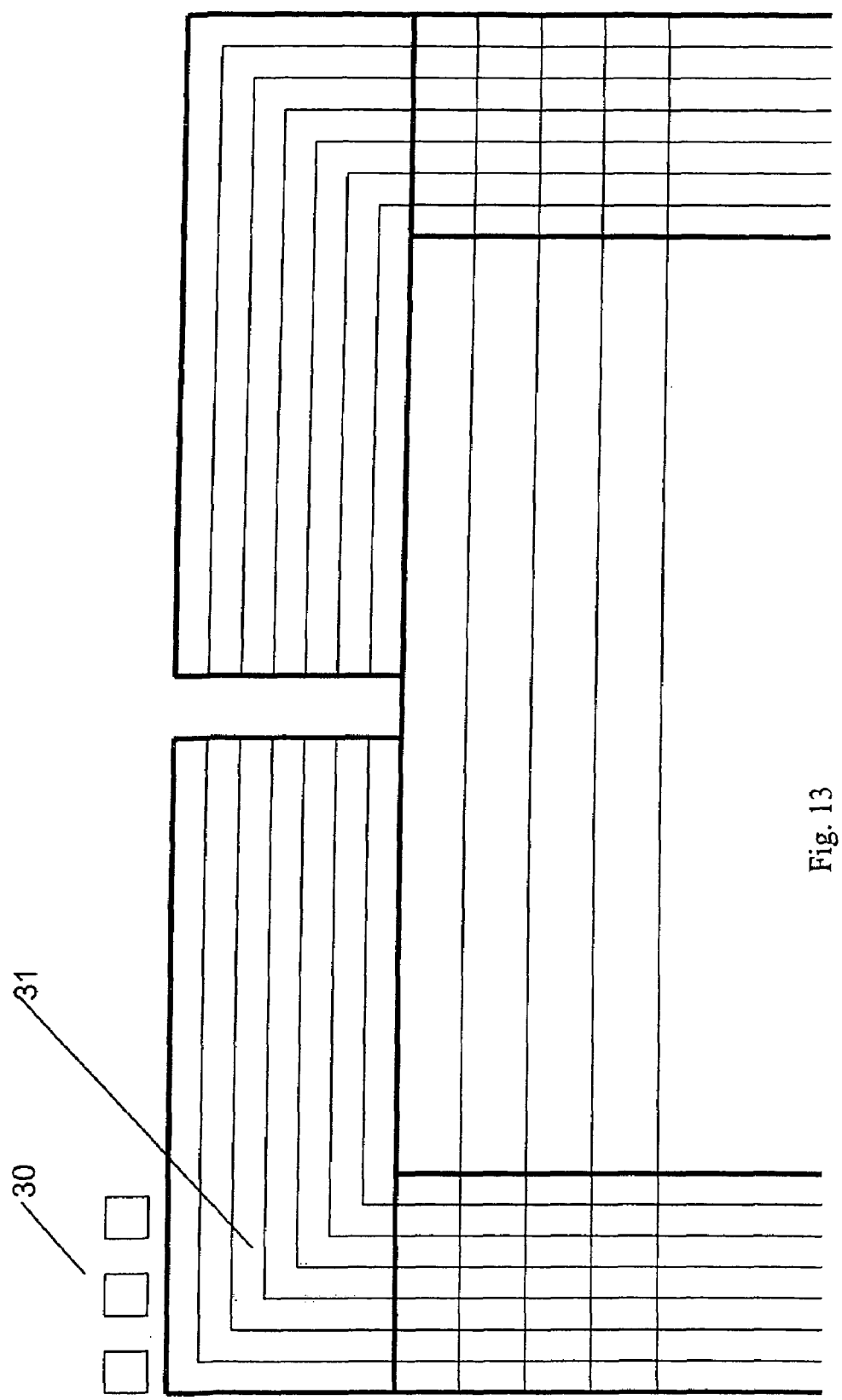
FIG. 13 shows one embodiment of a display similar to that of FIG. 10 but adapted to provide for more than two sets of strips.

To create a new attribute, a user clicks inside a horizontal colour strip 20 shown in FIG. 12 which is currently empty. The program then prompts the user for the attribute name, and displays it alongside an option box. Such an option box would be similar to the option boxes 11 shown in FIG. 11.

If more than seven attributes are required to be shown on each side of the screen, further sets of seven attributes can be set up which are displayed on request by the user, for example clicking on numbered navigation buttons 30. The rainbow strips relating to each set can be overlaid with a large number 31 for identification.

The particular embodiment(s) hereinbefore described may be varied in construction and detail, e.g., interchanging (where appropriate or desired) different features of each.

The invention claimed is:

1. A computer-implemented method of interactively managing information correlating a list of items and a list of attributes which are external to, and independent of, the items but which at least some attributes being selectively allocated to the items, comprising:

displaying the list of items as a column of rows, each row displaying the name of an item in the list of items;

displaying to the side of the column a set of vertical strips extending the length of the column, each strip being associated with a different attribute of the list of attributes; and displaying markers in the strips at selected positions where the strips cross rows, said positions being selected in accordance with whether the item named in the crossed row has the attribute associated with that strip;

wherein the vertical strips extend beyond the column of rows of items and have horizontal extensions themselves forming a column of rows, each row displaying the name of an attribute in the list of attributes;

wherein the method further comprises storing the name of each item in the list of items and information identifying the attributes of each item;

wherein the horizontal extensions of each attribute strip further displays a filter option indicator;

and wherein the method further comprises receiving user input to select at least one filter option, storing the selected filter options and displaying the or each corresponding filter option indicator;

filtering the list of items according to the or each filter option selected by the user;

redisplaying the filtered list of items in the column of rows and the associated markers in the selected positions of the strips.

2. A computer-implemented method of interactively managing data elements in a computer system, each data element having at least one associated attribute, the attribute being external to, and independent of, the data element, at least some attributes being selectively allocated to the data element, the method comprising:

storing identifiers of each data element and information identifying the attributes of each data element;

displaying names associated with each of the data elements in a list as a column of rows, displaying a set of attribute strips arranged to extend vertically along at least one side of the column of rows and extend beyond the column of rows, the attribute strips further having horizontal extensions themselves forming a column of rows, each attribute strip being associated with a possible attribute for the data element, wherein each attribute strip has a first section containing a name of a possible attribute of a data element, a second section comprising a filter option indicator and wherein each attribute strip further comprises attribute marker sections for each data element;

displaying a marker in the attribute marker section of each attribute strip if the data element possesses the attribute associated with that attribute strip based on the stored data;

receiving user input to select at least one filter option;

storing the selected filter options and displaying the or each corresponding filter option indicator;

filtering the data elements according to the or each filter option selected by the user; redisplaying the filtered data elements in the column of rows and the associated markers in the attribute marker section of each attribute strip.

3. A computer-implemented method according to claim 2 wherein data elements are selectively filtered based on the presence or on the absence of a selected attribute.

4. A computer-implemented method according to claim 2 wherein the data elements are filtered using a combination of positively or negatively selected attributes.

5. A computer-implemented method according to claim 2 further comprising storing information indicating whether each data element possesses each attribute.

6. A computer-implemented method according to claim 2 wherein the attribute marker sections of the attribute strips are provided at the intersection between each attribute strip and each row in the column of rows.

7. A computer-implemented method according to claim 2 further comprising allowing a user to select or deselect an attribute for a data element.

8. A computer-implemented method according to claim 7 wherein the attributes are selected or deselected by setting the marker on or off in the attribute marker section at the intersection of the data element row and the attribute column.

9. A computer-implemented method according to claim 2 further comprising storing a first table separately from the data elements, wherein the table comprises an identifier of each attribute and a filtering flag indicating whether the attribute has been selected for filtering.

10. A computer-implemented method according to claim 2 further comprising providing a second table for storing information associated with the data elements wherein the table comprises a pointer to each data element and an attribute flag for each attribute in the first table showing whether the attribute is on or off.

11. A computer-implemented method according to claim 2 wherein the horizontal extension of each attribute strip includes the first section containing the attribute identifier and the second section containing the filter option indicator.

12. A computer-implemented method according to claim 2 wherein each attribute strip is mutually visibly distinct.

13. A computer-implemented method according to claim 2 further comprising providing a plurality of sets of attribute strips associated with a plurality of sets of attributes and providing selection means for a user to select one or more sets of attribute strips to be displayed.

14. A computer-implemented method according to claim 13 wherein seven attribute strips are provided for each page of attributes.

15. A computer-implemented method according to claim 14 wherein the seven attribute strips are coloured in a rainbow of colours.

16. A computer-implemented method according to claim 2 further comprising receiving user input to create a new attribute and assign the new attribute to selected data elements.

17. A computer-implemented method according to claim 2 wherein identifiers of data elements that are not installed are displayed.

18. A computer-implemented method for displaying a filterable list of items, the method comprising: displaying the list of items as a column of rows, each row displaying name pertaining to the item, this column being enclosed by a set of horizontal differently coloured strips set one above the other across the top and a matching set of vertical coloured strips down one or both sides, each vertical strip forming a right-angle with its correspondingly coloured horizontal strip, together forming a rectangular approximation to a rainbow;

displaying in each or some of the horizontal coloured strips the name of an attribute that the items in the list may possess, as well as an option box to allow filtering of the list on the presence or absence of the attribute, wherein each attribute is external to, and independent of, the items, at least some attributes being selectively allocated to the items;

using each rectangle formed by the intersection of a vertical coloured strip and a horizontal item row to display a marker if the item possesses the attribute shown in the corresponding horizontal coloured strip;

further using this rectangle, where the user is allowed to set the attribute, to accept a mouse click from the user to toggle the attribute on or off for the item;

allocating a first table separately from the items to be listed, each element to contain an attribute name and a flag indicating whether the attribute has been selected for filtering, and if so whether positively or negatively;

allocating a second table for storing as many elements as there are items to be listed, each element containing a pointer to the item, as well as a flag for each attribute in the first table showing whether the attribute is on or off;

initializing the first table with attribute names;

generating entries in the second table for each item to be listed;

updating the filtering flags in the first table according to input from the user;

updating the attribute flags in the second table according to input from the user;

displaying the attributes together with the list of items or a subset thereof according to the two tables.

19. A computer-readable device for interactively managing data elements in a computer system, each data element having at least one associated attribute, the attribute being external to, and independent of, the data element, at least some attributes being selectively allocated to the data element, the device arranged to carry out a method comprising:

storing name associated with each data element and information identifying the attributes of each data element;

displaying the names associated with each of the data elements in a list as a column of rows, displaying a set of attribute strips arranged to extend vertically along at least one side of the column of rows and extend beyond the column of rows, the attribute strips further having horizontal extensions themselves forming a column of rows, each attribute strip being associated with a possible attribute for the data element, wherein each attribute strip has a first section containing name of a possible attribute of a data element, a second section comprising a filter option indicator and wherein each attribute strip further comprises attribute marker sections for each data element;

displaying a marker in the attribute marker section of each attribute strip if the data element possesses the attribute associated with that attribute strip based on the stored data;

receiving user input to select at least one filter option;

storing the selected filter options and displaying the or each corresponding filter option indicator;

filtering the data elements according to the or each filter option selected by the user; redisplaying the filtered data elements in the column of rows and the associated markers in the attribute marker section of each attribute strip.

20. A computer-implemented method according to claim 2 wherein a first set of attributes are selectively allocated to the data element by a user and a second set of attributes that are read-only and that cannot be selectively allocated to the data element.

* * * * *